June 8, 1926. 1,588,272

G. H. SCANLAN

CLUTCH FOR TRACTORS

Original Filed Dec. 24, 1919   4 Sheets-Sheet 1

WITNESSES

INVENTOR
George H. Scanlan
BY
ATTORNEYS

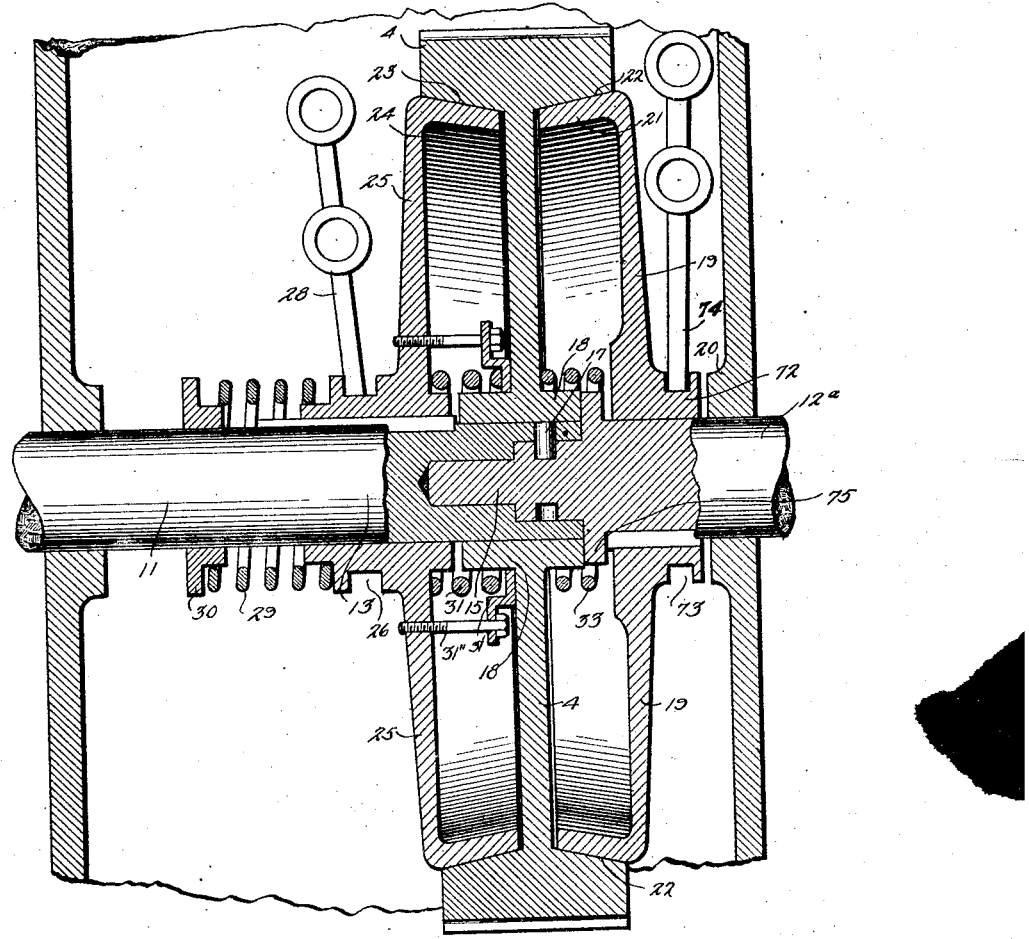

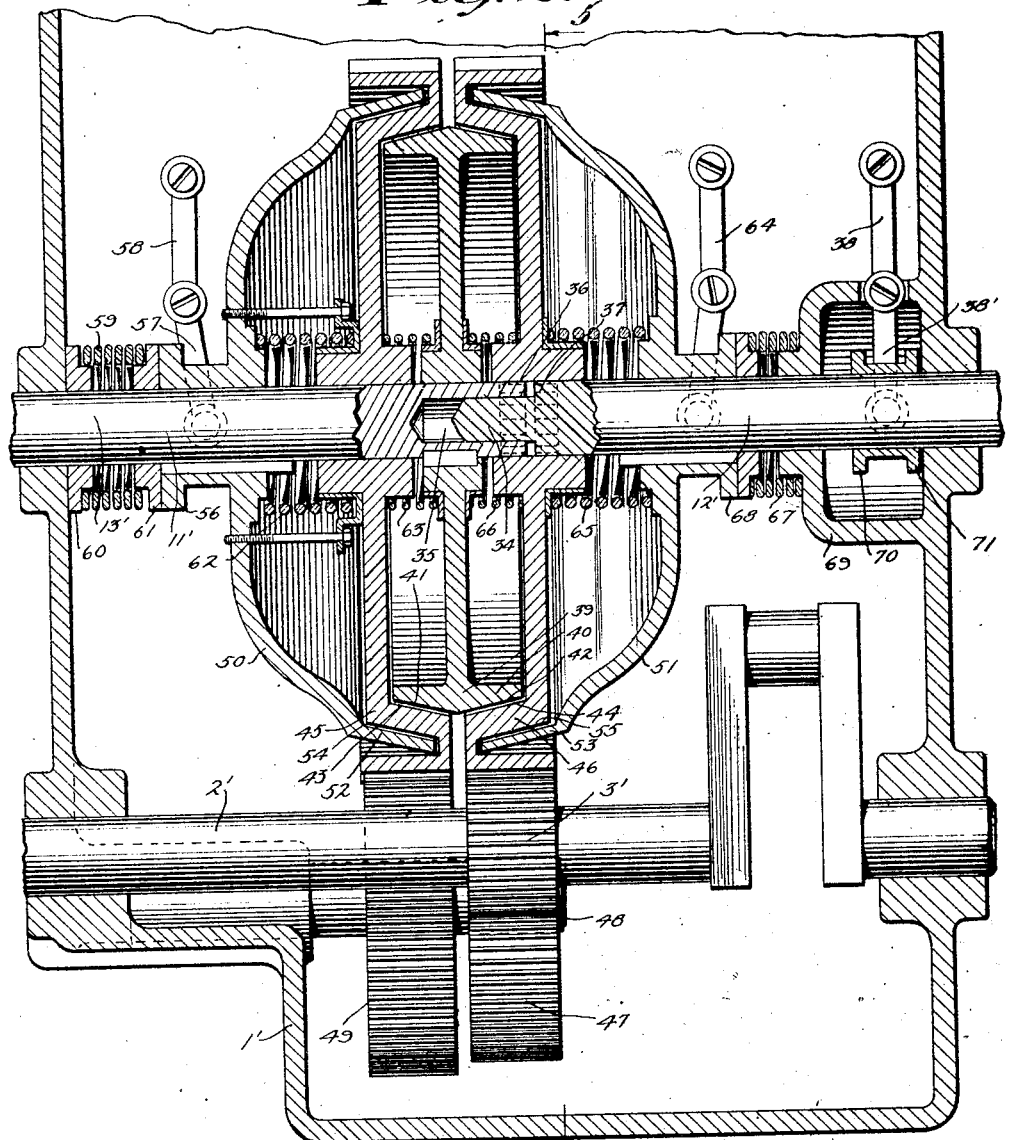
Fig. 2.
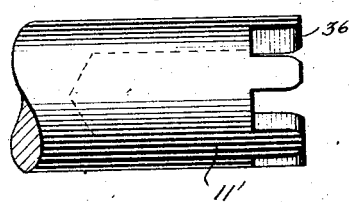
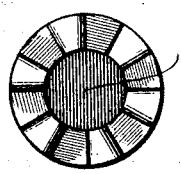
Fig. 3.  Fig. 4.
INVENTOR.
GEORGE H. SCANLAN,
BY Munn & Co
ATTORNEYS
WITNESSES

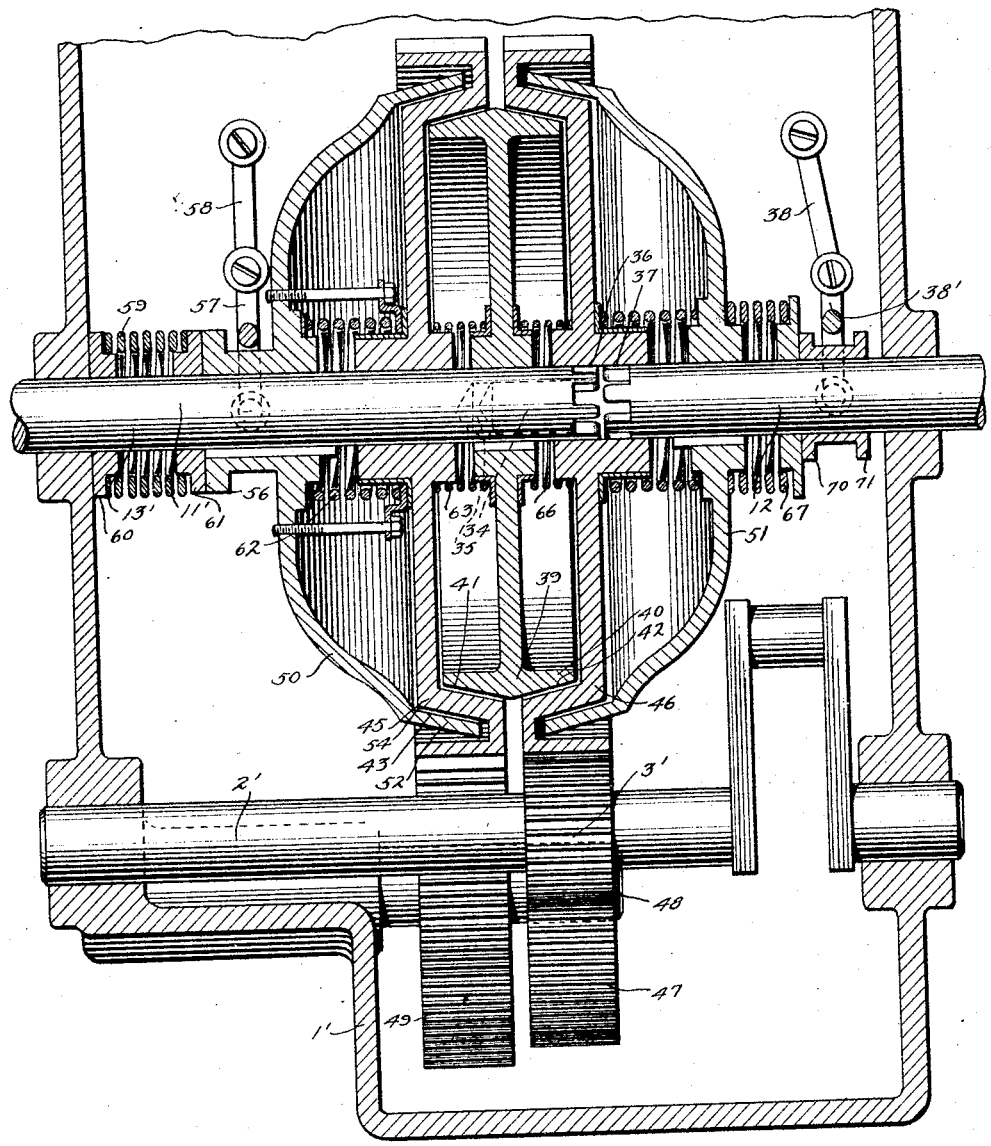

Patented June 8, 1926.

1,588,272

UNITED STATES PATENT OFFICE.

GEORGE H. SCANLAN, OF NEW YORK, N. Y.; MARY G. SCANLAN ADMINISTRATRIX OF SAID GEORGE H. SCANLAN, DECEASED.

CLUTCH FOR TRACTORS.

Application filed December 24, 1919, Serial No. 347,057. Renewed October 30, 1925.

This invention relates to clutches, and has for an object to provide an improved clutch which is especially adapted for use on tractors and the like, and has for an object to provide an improved construction wherein the clutch members may be quickly and easily shifted without injury to themselves or any part of the structure.

Another object in view is to provide an improved clutch mechanism which may be easily operated in a simple manner for producing a turning action of the tractor.

A further object of the invention is to provide a clutch mechanism for a tractor wherein the parts are arranged so that the clutch may be actuated by one, two or more levers and may be caused to drive the tractor forward with the shifting of one or two levers or to produce a forward or rear driving action by the shifting of the same levers.

An additional object is to provide a clutch mechanism in connection with a divided shaft which may be actuated by a single lever to cause both parts of the shaft to rotate forward in the same direction or rearwardly in the same direction, or if desired to cause only one part of the shaft to rotate so as to produce a turning movement.

In the accompanying drawings:

Figure 1 is a horizontal section through a clutch embodying the invention together with part of a tractor for illustrating how the clutch may be mounted when in operation.

Figure 1ª is a view similar to Figure 1, but showing a slightly modified form of the invention wherein each clutch member is shiftable independently.

Figure 2 is a sectional view similar to Figure 1, except that it discloses a slightly modified form of the invention.

Figure 3 is a fragmentary side view of one of the tractor shafts.

Figure 4 is an end view of the shaft shown in Figure 3.

Figure 5 is a horizontal sectional view similar to Figure 2, but showing a slightly modified arrangement wherein only two shifting levers are used.

Figure 1:
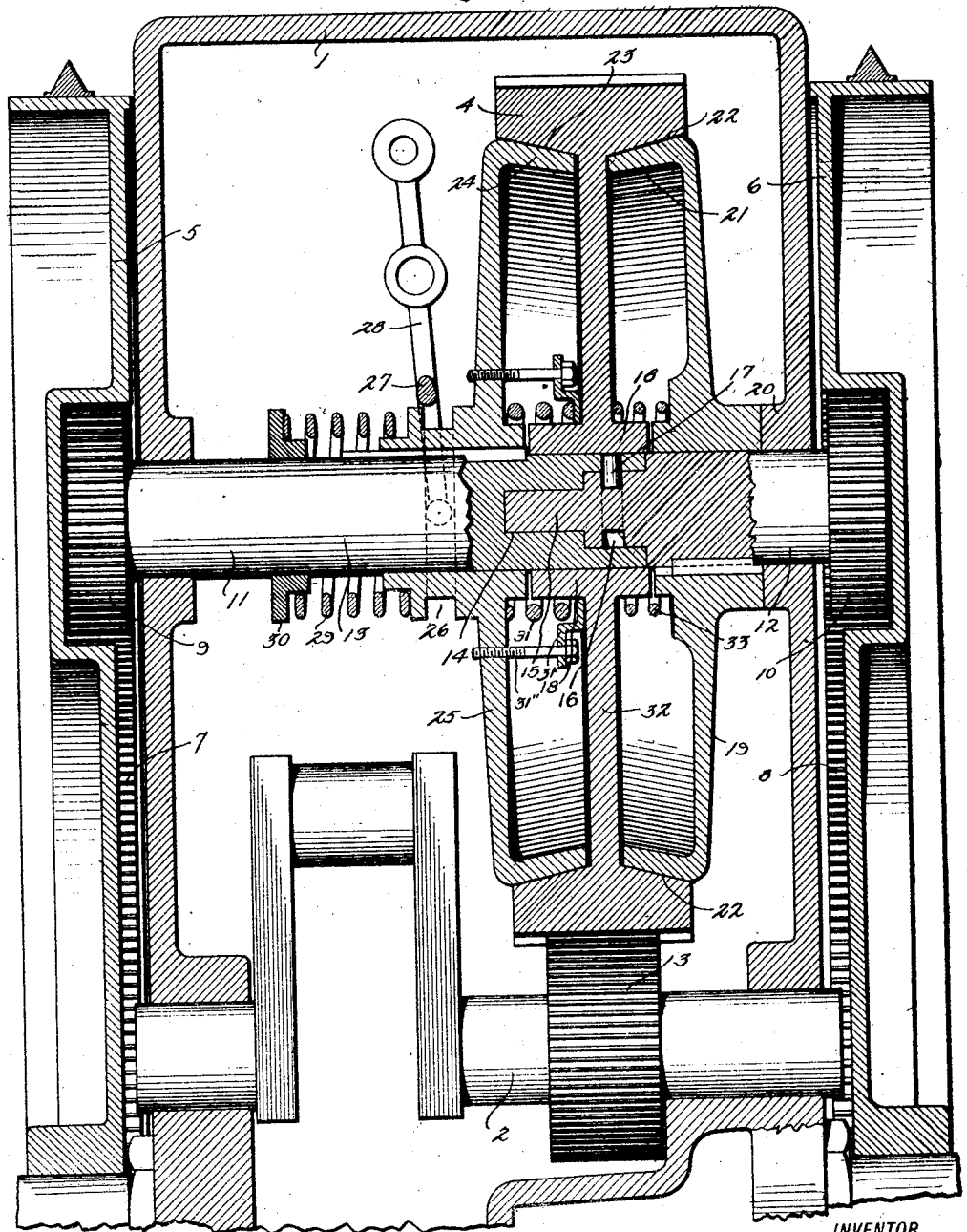

The clutch embodying the invention may be used for large or small tractors, and is a special advantage in small tractors or medium sized tractors. Heretofore in the small tractor the propelling agent has been connected directly with the bull wheels or connected by an ordinary clutch which will drive the shaft which in turn will drive the bull wheels. By this mechanism the tractor would move forwardly in a proper manner but could not be turned except by the driver turning the wheels by hand or otherwise turning the tractor around. The clutch embodying the present invention is intended to obviate this necessity of manually turning the tractor around without adding any complicated parts or unnecessary machinery. In fact the clutch mechanism embodying the invention is intended to act in what may be termed as three capacities, namely as a clutch for driving both wheels forwardly, driving both wheels rearwardly, or driving one of the wheels without driving the other wheel whereby the tractor will turn around under its own power, and not only under its own power but in a minimum space.

Referring to the accompanying drawings, 1 indicates an engine casing of a tractor, said casing having arranged therein the usual crank shaft 2 designed to be operated by the engine, said shaft carrying a master pinion 3 continually meshing with what may be termed a clutch gear 4. The casing 1 may be supported in any desired manner on the bull wheels 5 and 6, said bull wheels being of any desired construction. Preferably the bull wheels are provided with annular racks 7 and 8 which are continually meshing with the driving pinions 9 and 10 connected to the shaft sections 11 and 12 of the shaft 13. The shaft sections 11 and and 12 are independently rotatable if taken alone, but cannot be moved longitudinally independently as the section 11 is provided with a socket 14 in which the spindle or projection 15 fits. Spindle 15 is provided with an annular groove 16 in which one or more pins 17 extend, said pins also extending through part of section 11 whereby the two sections are connected together so as to move as a unit longitudinally in case any movement is to be had, though ordinarily there is no appreciable movement. It will be noted that each section is freely rotatable independently of the other so that if power is connected with either section the respective bull wheel associated therewith will be rotated, while the other bull wheel will remain stationary, thus causing a quick turning of the entire tractor under the power of the engine or other driving member. Arranged preferably at approximately the point of juncture of the sections 11 and 12 is the hub 18 of the clutch gear 4, said hub being loosely mounted on the shaft 13. A clutch disk 19 is keyed or otherwise rigidly secured to section 12 of shaft 13 and continually contacts with an extension 20 of casing 1, said disk being provided with a clutch ring 21 engaging the clutch face 22 of the clutch gear 4. The clutch face 22 is an outer friction face against which the ring 21 contacts for driving the shaft 13, or section 12 thereof, while the opposite clutch face 23 co-acts with the ring 24 for driving the section 11. It will be noted that both of the clutch rings 21 and 24 drive the shaft 13 in the same direction, but by the arrangement of the clutches as described and the use of the springs 31 and 33 clutch ring 19 will first engage and will be the last to disengage so that the bull wheel 6 associated therewith will be rotated while the bull wheel 5 is stationary, or will be rotated at a greater speed so as to produce a wide turning action. Clutch disk 25 is splined on to section 11 so as to freely slide into and out of engagement with the clutch gear 4. The clutch disk 25 is provided with a hub having an annular groove 26 for receiving a yoke 27 of the actuating lever 28, which lever may extend to any desired distance to be shifted manually at any time as may be desired. Preferably the lever 28 has a pawl and rack or other mechanism to hold it in any position in which it may be placed. This is desirable to produce the various actions hereinafter fully described. A spring 29 presses against the hub of disk 25 and against a stop 30 rigidly secured to section 11, said spring urging the disk 25 to continually engage the clutch wheel 4. A spring 31 of less strength than spring 29 is arranged between the web 32 of the clutch gear 4 and disk 25, said spring acting to separate the ring 24 from the clutch gear. A third spring 33 is arranged between the web 32 and the disk 19 so as to move the clutch gear 4 away from the clutch ring 21 whenever permitted. From Figure 1 it will be noted that the spring 31 is limited in its expansion by a ring 31' held in any adjusted position by a number of adjusting bolts 31". This arrangement is desirable as the movement of the clutch ring 24 is very small. Spring 33 is preferably weaker than spring 31 so that when lever 28 moves the disk 25 toward the clutch gear 4 spring 33 will be sufficiently compressed by web 32 to permit the ring 21 to engage the clutch face 22 and be rotated thereby before the clutch ring 24 is moved over a sufficient distance to engage the clutch face 23. By this construction and arrangement the section 12 will be driven and consequently the bull wheel 6 rotated so as to turn the tractor under the power of the engine. When it is desired to rotate both bull wheels simultaneously for causing the tractor to move forward lever 28 is moved over quickly for its full distance whereupon both the rings 21 and 24 will tightly engage the respective faces 22 and 23. This will cause the clutch wheel to rotate both of the disks 19 and 25 and thereby rotate both the sections 11 and 12. By providing the spring 33 weaker than the spring 31 the movement of the disk 25 by lever 28 will cause the spring 31 to shift the clutch gear 4 so as to engage the ring 21 and drive the same before ring 24 is moved sufficiently to be driven by the clutch wheel. Sometimes it is desirable to turn the tractor in a comparatively wide circle and in order to do this the clutch ring 24 is let out gradually so that it will slip to a certain extent and consequently the bull wheel 5 will be driven at a slower speed than the bull wheel 6. The degree of slipping determines the difference in speed of rotation of the bull wheels. As, for instance, when there is but a small slipping the wheel 6 will rotate only slightly faster than wheel 5, while if the clutch ring 24 is practically disengaged and the ring 21 is still in operative contact, wheel 5 will stand still and the bull wheel 6 will rotate at the usual speed, which will result in quickly turning the tractor within its own length.

Figure 1ª is similar to Figure 1, except that the clutch disk 19 is splined on the section 12ª and is provided with a hub 72 formed with a groove 73 for receiving the yoke of lever 74. If preferred some other form of shifting means could be provided instead of this lever and yoke arrangement without in any way departing from the spirit of the invention, as the use of this lever is merely one means for shifting the clutch independently of the clutch disk 25. It will be noted that in Figure 1 the operation of the entire clutch is from one side, and that the clutch disk 19 always engages the bull wheel 6. In Figure 1ª this same result may be secured, and in addition other results, as for instance simultaneous clutching of both members, or the independent clutching of either member. This independent clutching feature is very desirable as either section 12ª or section 11 of the shaft 13 may be rotated independently and consequently the tractor turned either to the right or left in a small space or upon a large curve. In order to secure this result the section 12ª in this form of the invention is provided with a flange 75 formed integral therewith or rigidly secured thereto, said flange acting as an abutment against which the hub of gear wheel 4 presses when lever 28 is released, and permits the spring 29 to force the clutch disk 25 firmly into a clutched position. When the disk 25 is in a clutched position the disk 19 may be moved out of clutch if desired either quickly or slowly so as to cause a quick or slow turning action. When the disk 19 is thrown fully into clutch and disk 25 is also put into clutch and it it desired to disengage the shaft 13 from the engine, lever 28 should be moved against the action of spring 29 until both rings 21 and 24 are disengaged. As the disk 25 begins to move in a direction away from disk 19 the clutch wheel 4 will also move therewith under the action of spring 33, thus causing a quick releasing or slipping action between the respective rings 21 and 24 and contact surfaces 22 and 23.

In Figure 2 will be seen a slightly modified form of the invention in which not only a forward drive and a turning movement is secured, but also a reverse or rear drive is secured. The reverse or driving to the rear is not provided for in the structure shown in Figure 1, but is provided for in the structure shown in Figures 2 and 5. Referring to Figure 2 numerals 11' and 12' indicate the sections of the shaft 13', said sections being separate, but held in alignment by a pin or projection 34 extending from section 12' into a socket 35 arranged in the end of section 11'. The respective sections are provided with teeth 36 and 37 which are adapted to interlock when the lever 38 is operated in one direction, which moves section 12' over a proper distance for this purpose. When these two sections are interlocked by teeth 36 and 37 they will positively operate together in either a forward or rearward movement. In the form of the invention shown in Figure 1, the gear clutch 4 is loosely mounted upon the shaft 13, while in the structure shown in Figure 2 the driving clutch wheel 39 is keyed or otherwise rigidly secured to the section 11' so as to always rotate therewith. The wheel 39 is provided with a web or some connection between the hub and the rim 40, which rim is formed with oppositely inclined friction faces 41 and 42 adapted to be brought into operative engagement with the faces 43 and 44 of the clutch gears 45 and 46, which are loosely mounted on the respective sections 11' and 12'. These clutch gears are formed identical with the clutch gears shown in Figure 1, except for the friction faces 43 and 44 which may be brought into engagement with the faces 41 and 42 respectively whenever desired. The clutch gear 46 continually meshes with the master pinion 3' which is rigidly secured to the crank shaft 2' whereby the connection between the crank shaft and the gear 46 is direct and continuous. In addition to meshing with the clutch gear 46 the master gear 3' meshes with a gear 47 supported by a suitable stub shaft 48, which shaft is preferably rotatably mounted in the casing 1' so that if the gear 47 is rigidly secured to shaft 48 and a second gear 49 is also secured to shaft 48 said last mentioned gear will rotate whenever gear 47 rotates. Gear 49 meshes continually with the clutch gear 45, but by reason of the way in which it receives its power the direction of rotation of gear clutch 45 is opposite to clutch gear 46, but both are driven from the crank shaft 2'. Associated with the clutch gears 45 and 46 are clutch members 50 and 51 which have clutch rings 52 and 53 adapted to be brought into frictional engagement with the friction faces 54 and 55 of the clutch gears 45 and 46. The clutch member 50 is splined on the shaft 13' and provided with a hub 56 having a groove for receiving a yoke 57 of a lever 58 whereby the clutch member 50 may be moved into and out of engagement with the clutch wheel 45. A spring 59 is provided which bears against a disk 60, which in turn presses against the casing 1' while the spring at the opposite end also bears against a washer 61 associated with the hub 56 whereupon in case the lever 58 is loose it will force the clutch 50 over until it engages the clutch wheel 45 and forces the same into proper frictional engagement with the face 41 of wheel 39 so as to drive the section 11' and all parts connected therewith. It will be noted that a spring 62 is provided between the clutch member 50 and the clutch gear 45 so that the first movement of the clutch member 50 will cause the clutch gear 45 to move over against the action of the comparatively weak spring 63 until the face 41 has been engaged. By reason of spring 62 this face will be first engaged and then ring 52 will engage the frictional face 54 for transmitting motion to the section 11'. The rotation of the section 11' will be in a reverse direction and the tractor will consequently turn around toward the rear. When it is desired to turn the tractor around toward the front the lever 64 is moved against the action of spring 65 which will cause the comparatively weak spring 66 to be collapsed and the faces 42 and 44 to come into proper engagement whereupon the wheel 39 will be rotated and consequently the section 11' rotated in the opposite direction or toward the front. If the motion is sufficiently far, or a full throw of the lever 64, the ring 53 of the clutch member 51 will engage the frictional surface 55 of the clutch gear 46 so that not only will the section 11' rotate but clutch member 51 and section 12' will rotate thus driving the tractor in a forward direction.

If desired and to always insure that there will be no slipping of the parts in order to obtain a straightforward drive, lever 38 is usually thrown over to force section 12' toward section 11' for causing the teeth 36 and 37 to intermesh their full depth, although the same also mesh when the lever 64 has been thrown over to its extreme clutch position. It will thus be seen that section 11' may be rotated in either direction for producing a forward or rear turning action, and by properly manipulating either lever 64 alone or levers 64 and 38 the bull wheels connected to the shaft 13' may be driven forwardly. A spring 67 is provided between the grooved hub 68 which co-acts with the yoke for lever 64 and a casing 69 extending from the casing 1'. Spring 67 is intended to be heavier and stronger than springs 65 and 66 so as to compress said springs and cause a firm clutching action of all parts in case lever 64 should be loose. The casing 69 accommodates stops 70 and 71 which are rigidly secured in any suitable manner to the section 12' so that whenever the yoke 38' of lever 38 is actuated the section 12' will be shifted longitudinally.

In Figure 5 the same general structure is shown as illustrated in Figure 2, except that lever 64 has been eliminated and the spring 67 caused to bear against the clutch member 51 directly so that when the lever 38 is moved over to its extreme clutched position not only will the teeth 36 and 37 become meshed or engaged, but the clutch member 51 will be pressing tightly against the clutch gear 46 and said clutch gear will be pressing tightly against the wheel 39 whereby the shaft 13' will be driven in a forward direction.

What I claim is:

1. A clutch for driving a divided shaft, comprising a clutch member rigidly secured to one division of said shaft and a clutch member splined on the other division of said shaft, a manually operated lever connected to said splined clutch member, a driving member arranged between said clutch members, said driving member being movable toward or from either clutch member and formed with faces adapted to engage said clutch members, and springs arranged between the respective clutch members and the driving member, said springs being overcome by said lever when actuated in one direction, one of said springs being stronger than the other and when actuated by said lever forcing said driving member against the rigid clutch member overcoming the spring associated therewith, thereby engaging the latter clutch member before engaging the splined clutch member.

2. In a clutch of the character described for driving a divided shaft, a driving member, a clutch member connected with each part of said shaft, said clutch members being arrranged on opposite sides of the driving member, a spring arranged between said driving member and each of the clutch members, adjustable means between one of the clutch members and the driving member for varying the action of the spring adjacent the driving member and means for shifting the position of said last mentioned clutch member toward and from the driving member whereby it will operatively engage said driving member and be rotated thereby.

3. In a clutch of the character described for driving a divided shaft, a driving member, a clutch member arranged on each side of said driving member and connected to the respective parts of said shaft, an independent spring arranged between each clutch member and the driving member, means for adjusting the operative length of one of said springs and means for letting said clutch members into an operative position with the driving member and moving the same out of said operative position.

4. A clutch for driving a divided shaft comprising a clutch member rigidly secured to one division of said shaft, a clutch member splined on the other division of said shaft, a manually operated lever for moving said splined clutch member, a driving member arranged between said clutch members, said driving member being formed with oppositely positioned faces for engaging said clutch members, springs arranged between the respective clutch members and the driving member, said springs being overcome by said lever when actuated in one direction, one of said springs being stronger than the other so as to cause one clutch member to engage operatively before the other and adjusting means for varying the operative length of said stronger spring.

5. A clutch for tractors and the like, comprising a gear presenting outwardly diverging clutch faces, a fixed clutch member adapted to engage one of said faces, a movable clutch member adapted to engage the other of said faces, a shaft section connected with each of said clutch members, a manually actuated lever adjacent the movable clutch member, spring means between the gear and the clutch members, the spring adjacent the movable clutch member being of a greater tension than the spring adjacent the fixed clutch member, and upon moving said lever for said movable clutch member to engage said gear the latter under the action of the stronger spring moves toward the fixed clutch member, thereby engaging the same before the movable clutch member engages the gear.

6. A clutch for driving a divided shaft, comprising a clutch member rigidly secured to one part of said divided shaft, a clutch member splined on the other part of said divided shaft, a manually operated lever for moving said splined clutch member into clutch, a driving member arranged between said clutch members, said driving member being formed with opposed faces, springs arranged between the respective clutch members, and driving member, said springs being overcome by said lever when actuated in one direction, the spring adjacent the splined clutch member being stronger than the spring adjacent the rigidly secured clutch member so as to cause the latter clutch member to engage before the other.

7. In a clutch of the character described for driving a divided shaft, a driving member, a clutch member arranged on each side of the driving member and secured respectively to the parts of the divided shaft, a spring arranged betwen each of said clutch members and said driving member, adjustable means arranged between one of said clutch members and the driving member for varying the action of the spring therebetween, and means for shifting the position of said last mentioned clutch member toward and from the driving member for permitting said driving member to engage or disengage the other clutch member before the former operatively engages said driving member.

8. A clutch for tractors, comprising a divided shaft, a gear having outwardly diverging faces movably mounted on said shaft, a splined clutch member on one side of said gear, a fixed clutch member on the other side thereof, and means associated with said clutch members and gear for permitting the fixed clutch member to remain engaged with said gear until after the splined clutch member has been withdrawn from engagement with said gear.

GEORGE H. SCANLAN.